(12) United States Patent
Pelster et al.

(10) Patent No.: US 8,735,488 B2
(45) Date of Patent: May 27, 2014

(54) BLACK, METHOD FOR THE PRODUCTION THEREOF, AND USE THEREOF

(75) Inventors: Thomas Pelster, Brühl (DE); Burkhard Freund, Neumünster (DE); Joachim Fröhlich, Neumarkt (DE); Werner Niedermeier, Brühl (DE); Conny Vogler, Ruppichteroth (DE)

(73) Assignee: Orion Engineered Carbons GbmH, Frankfurt am Main (DE)

( * ) Notice: Subject to any disclaimer, the term of this patent is extended or adjusted under 35 U.S.C. 154(b) by 761 days.

(21) Appl. No.: 12/680,453

(22) PCT Filed: Sep. 4, 2008

(86) PCT No.: PCT/EP2008/061701
§ 371 (c)(1),
(2), (4) Date: Oct. 25, 2010

(87) PCT Pub. No.: WO2009/043676
PCT Pub. Date: Apr. 9, 2009

(65) Prior Publication Data
US 2011/0034611 A1  Feb. 10, 2011

(30) Foreign Application Priority Data

Oct. 4, 2007 (DE) .......................... 10 2007 047 432

(51) Int. Cl.
*C08K 3/04* (2006.01)
*C01B 31/00* (2006.01)

(52) U.S. Cl.
USPC ....................................... 524/495; 423/449.1

(58) Field of Classification Search
USPC ........................................ 524/495; 423/449.1
See application file for complete search history.

(56) References Cited

U.S. PATENT DOCUMENTS

| 4,327,069 A * | 4/1982 | Cheng ............................ 423/450 |
| 4,927,607 A | 5/1990 | Berg et al. |
| 2004/0248731 A1 | 12/2004 | Vogel et al. |
| 2005/0256249 A1 | 11/2005 | Wang et al. |

FOREIGN PATENT DOCUMENTS

| EP | 0 384 080 | 8/1990 |
| EP | 0 754 735 | 1/1997 |
| EP | 0 949 303 | 10/1999 |
| EP | 1 783 178 | 5/2007 |
| WO | 91/13944 | 9/1991 |
| WO | WO 91/13944 | * 9/1991 ............... C09C 1/48 |

OTHER PUBLICATIONS

C. J. Stacy et al., "Effect of Carbon Black Structure Aggregate Size Distribution on Properties of Reinforced Rubber", (Presented at a meeting of the Rubber Division, American Chemical Society, Cleveland Ohio, May 6-9, 1975), Rubber Chemistry and Technology, vol. 48, pp. 538-547.
W. M. Hess et al., "The Effects of Carbon Black and Other Compounding Variables on Tire Rolling Resistance and Traction", (Presented at a meeting of the Rubber Division, American Chemical Society, Chicago Illinois, Oct. 5-7, 1982), Rubber Chemistry and Technology, vol. 56, pp. 390-417.
Gerard Kraus, "Reinforcement of Elastomers by Carbon Black", Phillips Petroleum Company, Bartlesville, Oklahoma, USA, received Feb. 27, 1976, pp. 215-248.
International Search Report for PCT/EP2008/061701 mailed Sep. 16, 2009.
PCT Notification Concerning Transmittal of International Preliminary Report on Patentability (Form PCT/IB/326) for PCT/EP2008/061701 mailed Apr. 15, 2010 (in English language).
PCT International Preliminary Report on Patentability (Form PCT/IB/373) for PCT/EP2008/061701 dated Apr. 7, 2010 (in English language).
PCT Written Opinion of the International Searching Authority (Form/ISA/237) for PCT/EP2008/061701 dated Apr. 7, 2010 (in English language).

* cited by examiner

*Primary Examiner* — Robert D. Harlan
(74) *Attorney, Agent, or Firm* — Smith, Gambrell & Russell, LLP

(57) ABSTRACT

The invention relates to black having a CTAB surface area of 100 to 160 m²/g, a quartile ratio of more than 1.60, and an FP index of >0. Said black is produced in a furnace reactor. Sixty to 90 percent by weight of the raw black material are injected into the reactor in the first third of the reaction zone, while the remaining amount of the raw black material is injected into the reactor upstream at least in one other point. In addition, the combustible is conducted such that 90 to 100 percent by weight of the combustible are evaporated when first hitting the raw black material and 80 to 99 percent by weight of the combustible are evaporated 5 ms before hitting the raw black material. Said blacks can be used in rubber mixtures.

15 Claims, 1 Drawing Sheet

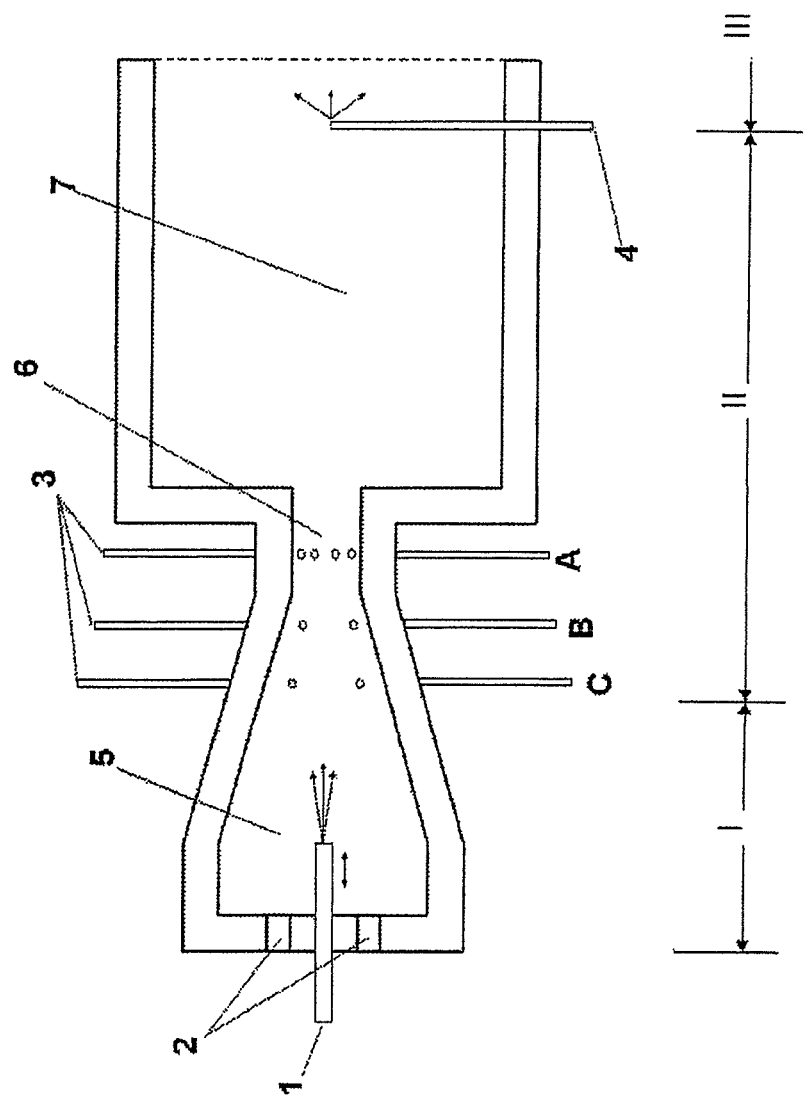

BLACK, METHOD FOR THE PRODUCTION THEREOF, AND USE THEREOF

The invention relates to a carbon black, to a process for production of the same, and also to the use of the same.

Carbon blacks are conventionally used as pigments or reinforcing fillers or other fillers, and for a wide variety of other applications. By way of example, carbon blacks are used as reinforcing fillers in rubber mixtures which can be used as a starting material for tire treads.

It is well known that the specific surface area of carbon black has considerable effect on the reinforcing behavior of carbon black in rubber mixtures. The higher the specific surface area here, the better the reinforcing behavior and in particular the abrasion behavior of tire treads [G. Kraus, Angewandte Makromolekulare Chemie [Applied Macromolecular Chemistry], Volume 60/61 (1977), page 215]. However, high specific surface area has the disadvantage that the rubber mixture has high hysteresis, a consequence of which is that the tire treads have increased rolling resistance [W. M. Hess et al., Rubber Chemistry and Technology, Volume 56, page 390]. Higher rolling resistance of tire treads causes higher fuel consumption and thus high energy consumption and/or carbon dioxide emission. This is undesirable, for economic and environmental reasons.

It is therefore desirable, for environmental and economic reasons, to achieve a further decrease in hysteresis of rubber mixtures and thus the rolling resistance of tire treads, for a given specific surface area. It is known that this can be achieved, for a given specific surface area, by broadening the aggregate-size distribution [W. M. Hess et al., Rubber Chemistry and Technology, Volume 56, page 390]. However, when the aggregate-size distribution is broadened there is a simultaneous reduction in the tint strength of the carbon black [C. J. Stacy et al., Rubber Chemistry and Technology, Volume 48, page 538]. It is moreover known that, in particular when high stress levels are involved, a broadened aggregate-size distribution of carbon black impairs the abrasion behavior of rubber mixtures and therefore impairs the abrasion behavior of tire treads [W. M. Hess et al., Rubber Chemistry and Technology, Volume 56, page 390]. Broadening of aggregate-size distribution is therefore advantageous for rolling resistance, but is generally associated with poorer abrasion behavior.

US 2005/0256249 discloses a carbon material with $\Delta D50/M$ greater than 0.9 and with heterogeneity index greater than 2.3.

EP 0754735 discloses furnace blacks which, when compared with carbon blacks having identical CTAB surface area, feature lower rolling resistance together with identical or better wet-skid performance, when incorporated into SSBR/BR rubber mixtures. They can be produced in conventional carbon-black reactors, by conducting the combustion process in the combustion chamber in such a way that carbon-black nuclei form and are immediately brought into contact with the feedstock used for the carbon black.

A disadvantage of the carbon blacks disclosed in EP 0754735 is that abrasion resistance is too low, while rolling resistance is simultaneously low (loss factor tan $\delta$) in rubber mixtures.

EP 0949303 discloses carbon blacks which, when compared with the carbon blacks of EP 0754735, have an aggregate-size distribution with smaller proportions of large-diameter aggregates. This leads to improved abrasion behavior in rubber mixtures. The carbon-black reactors are run in such a way that carbon-black nuclei form and are immediately brought into contact with the feedstock used for the carbon black, with a suitable increase in the supply of combustion air and the feedstock used, for the carbon black.

A disadvantage of the carbon blacks disclosed in EP 0949303 is the reduction in tint strength and a non-ideal balance between abrasion resistance and rolling resistance, although abrasion resistance is better than that of the carbon blacks of EP 0754735, while rolling resistance is simultaneously low (loss factor tan $\delta$).

EP 1783178 discloses a furnace-black process in which a feedstock used for the carbon black is introduced in a first stage and is combined with a stream of hot gases, in order to form a precursor, consisting essentially of a carbon black in a reaction stream, and further amounts of the feedstock material used for the carbon black are then introduced to said precursor, with the aim of thus partially quenching the reaction stream and subsequently completely quenching the entire reaction stream. The stream of hot gases in EP 1783178 can be produced in the form of combustion gas from the reaction of a fuel with an oxidant, such as air, and the ratio of air to fuel here can vary from 1:1 (stoichiometric) up to an infinite ratio. The fuel can be a solid, liquid, or gaseous fuel.

It is an object of the present invention to provide a carbon black which, in rubber mixtures, provides a good balance of high abrasion resistance (=low abrasion) with low rolling resistance.

The invention provides a carbon black, characterized in that the CTAB surface area is from 100 to 160 m²/g, preferably from 100 to 149 m²/g, particularly preferably from 100 to 144 m²/g, very particularly preferably from 105 to 140 m²/g, the quartile ratio is greater than 1.60, preferably from 1.65 to 2.30, particularly preferably from 1.70 to 2.30, very particularly preferably from 1.75 to 2.30, with particular preference from 1.80 to 2.30, extremely preferably from 1.85 to 2.25, and the FP index is >0, preferably >0.5, particularly preferably >1.0, very particularly preferably >1.5.

The FP index is calculated from the following equation: FP index=tint strength−(65+(1.057 g/m²)*CTAB−(0.002745 g²/m⁴)*CTAB*CTAB−(25.96 g/cm³)*COAN−(0.201 g/m²)*(NSA−CTAB))+6.57502−847817*EXP(−6.94397*(quartile ratio)).

The CTAB value is measured to ASTM D3765-04.

The NSA value is measured to ASTM D6556-04, using the following parameters: relative pressures: section 10.4.4.

The COAN value is measured to ASTM D3493-06, using the following parameters: Oil: paraffin; method for end-point determination: procedure A.

The tint strength is measured to ASTM D3265-06, using the following parameters: Hoover Muller paste preparation, Erichsen tint tester—film drawdown method.

The quartile ratio is calculated from the aggregate-size distribution.

The aggregate-size distribution here is determined to the ISO 15825 standard, first edition, 2004-11-01, with the following modifications:

Supplement to section 4.6.3 of the ISO 15825 standard: The mode relates to the curve of distribution by mass (mass distribution curve).

Supplement to section 5.1 of the ISO 15825 standard: The equipment used comprises a BI-DCP Particle Sizer with associated dcplw32 evaluation software, Version 3.81, all of which is obtainable from Brookhaven Instruments Corporation, 750 Blue Point Rd., Holtsville, N.Y., 11742.

Supplement to section 5.2 of the ISO 15825 standard: The equipment used comprises a GM2200 ultrasound control unit, a UW2200 acoustic transducer, and a DH13G sonotrode. The ulstrasound control unit, acoustic transducer, and sonotrode are obtainable from Bandelin electronic GmbH & Co. KG, Heinrichstrasse 3-4, D-12207 Berlin. The values set here on the ultrasound control unit are as follows: Power %=50, Cycle=8. This corresponds to a nominal power level set at 100 watts and to pulse levels set at 80%.

Supplement to section 5.2.1 of the ISO 15825 standard: Ultrasound time is set at 4.5 minutes.

The definition given in section 6.3 of the ISO 15825 standard is varied by defining "surfactant" as follows: "surfactant" is Nonidet P 40 Substitute, which is an anionic surfactant from Fluka, obtainable from Sigma-Aldrich Chemie GmbH, Industriestrasse 25, CH-9471 Buchs SG, Switzerland.

The definition of spin fluid given in section 6.5 of the ISO 15825 standard is varied by defining spin fluid as follows: The spin fluid is produced by taking 0.25 g of Nonidet P 40 Substitute surfactant from Fluka (section 6.3) and making this up to 1000 ml with demineralized water (section 6.1). The pH of the solution is then adjusted to from 9 to 10 by using 0.1 mol/l NaOH solution. The spin fluid has to be used at most 1 week after it has been produced.

The definition of dispersion fluid given in section 6.6 of the ISO 15825 standard is varied by defining dispersion fluid as follows: The dispersion fluid is produced by taking 200 ml of ethanol (section 6.2) and 0.5 g of Nonidet P 40 Substitute surfactant from Fluka (section 6.3) and making this up to 1000 ml with demineralized water (section 6.1). The pH of the solution is then adjusted to from 9 to 10 by using 0.1 mol/l NaOH solution. The dispersion fluid has to be used at most 1 week after it has been produced.

Supplement to section 7 of the ISO 15825 standard: The material used is exclusively pelletized carbon black.

The instructions in sections 8.1, 8.2, and 8.3 of the ISO 15825 standard are together replaced by the following instruction: The pelletized carbon black is gently crushed in an agate mortar. 20 ml of dispersion solution (section 6.6) are then admixed with 20 mg of carbon black in a 30 ml beaded-rim bottle (diameter 28 mm, height 75 mm, wall thickness 1.0 mm) and treated with ultrasound (section 5.2) in a cooling bath (16° C.+/−1° C.) for a period of 4.5 minutes (section 5.2.1) so that the carbon black becomes suspended in the dispersion solution. After the ultrasound treatment, the specimen is measured in the centrifuge within a period of 5 minutes.

Supplement to section 9 of the ISO 15825 standard: The carbon black density value to be entered is 1.86 g/cm$^3$. The temperature for the temperature to be entered is determined in accordance with section 10.11. The option "aqueous" is selected for spin-fluid type. This gives a value of 0.997 (g/cc) for spin-fluid density and a value of 0.917 (cP) for spin-fluid viscosity. The light-scattering correction is applied by using options selectable in the dcplw 32 software: file=carbon.prm; Mie correction.

Supplement to section 10.1 of the ISO 15825 standard: Centrifuge speed is set to 11 000 r/min.

Supplement to section 10.2 of the ISO 15825 standard: 0.85 cm$^3$ of ethanol (section 6.2) is injected instead of 0.2 cm$^3$ of ethanol (section 6.2).

Supplement to section 10.3 of the ISO 15825 standard: Exactly 15 cm$^3$ of spin fluid (section 6.5) are injected. 0.15 cm$^3$ of ethanol (section 6.2) is then injected.

The instruction in section 10.4 of the ISO 15825 standard is omitted completely.

Supplement to section 10.7 of the ISO 15825 standard: Immediately after the start of data recording, the spin fluid in the centrifuge is covered with 0.1 cm$^3$ of dodecane (section 6.4).

Supplement to section 10.10 of the ISO 15825 standard: If the measurement curve does not return to the base line within a period of one hour, the measurement is terminated after precisely 1 hour of measurement time, rather than restarting with a different centrifuge-rotation rate.

Supplement to section 10.11 of the ISO 15825 standard: Instead of using the method described in the instructions for determining the measurement temperature, the measurement temperature T to be entered into the computer program is determined as follows:

$$T=\tfrac{2}{3}(Te-Ta)+Ta,$$

where Ta is the temperature of the measurement chamber prior to measurement and Te is the temperature of the measurement chamber after measurement. The temperature difference should not exceed 4° C.

The fraction of the particles >150 nm in the aggregate-size distribution can be smaller than 20% by weight, preferably smaller than 14% by weight, particularly preferably smaller than 10% by weight.

The fraction >150 nm is the proportion by weight of the aggregates having a Stokes diameter greater than 150 nm, and is likewise obtained from the aggregate-size distribution in accordance with the ISO 15825 standard described above.

The ratio calculated from the ΔD-50 value and the mode can be greater than 1.0, preferably greater than 1.05, very particularly preferably greater than or equal to 1.10.

The ΔD-50 value and the mode are likewise obtained form the aggregate-size distribution in accordance with the ISO 15825 standard described above.

Tint strength can be greater than 110, preferably greater than 114, particularly greater than 117, very particularly greater than 120.

The COAN value can be from 90 to 130 cm$^3$/100 g.

The carbon black can be a gas black, channel black, lamp black, or furnace black.

The carbon black of the invention can be a carbon black which has not undergone surface modification and which has not undergone post-treatment.

The pH of the carbon black of the invention can be >5.

The invention further provides a process for producing the carbon black of the invention in a furnace-black reactor which comprises, along the reactor axis, a combustion zone, a reaction zone, and a termination zone, via production of a stream of hot exhaust gas in the combustion zone via combustion of a fuel in an oxygen-containing gas and passage of the exhaust gas from the combustion zone via the reaction zone into the termination zone, mixing to incorporate a feedstock used for the carbon black into the hot exhaust gas in the reaction zone, and termination of carbon-black formation in the termination zone via introduction of water spray, characterized in that from 60 to 90% by weight, preferably from 75 to 85% by weight, of the feedstock used for the carbon black are introduced through a nozzle within the first third of the reaction zone, and the remaining amount of the feedstock used for the carbon black is introduced through a nozzle upstream at at least one further point into the reactor, and the fuel is conducted in such a way that on first encounter with the feedstock used for the carbon black from 90 to 100% by weight, preferably from 99 to 100% by weight, of the fuel has vaporized, and 5 ms prior to encountering the feedstock used for the carbon black from 80 to 99% by weight, preferably from 90 to 99% by weight, particularly preferably from 92 to 98% by weight, of the fuel has vaporized.

The fuel atomizer used can comprise either atomizers operating purely by using pressure (one-fluid atomizer) or else two-fluid atomizers using internal or external mixing. The fuel can be conducted in accordance with the invention either by using atomizers operating purely by using pressure (one-fluid atomizers) or else by using two-fluid atomizers with internal or external mixing, by selecting the conditions in such a way as to balance the following factors: the droplet size achieved during the atomization process, the residence time of these droplets prior to encountering the feedstock used for the carbon black, and the reaction temperatures. In particular, use of two-fluid atomizers and of liquid fuel permits control of droplet size within a wide range independently of throughput, and thus allows this to be balanced with the residence time of the fuel prior to encountering the feedstock used for the carbon black, and with the reaction temperatures.

Droplet-size distribution can be determined with the aid of optical methods. Various commercial nozzle manufacturers supply these measurements as a service, an example being Düsen-Schlick GmbH, Hutstrasse 4, D-96253 Untersiemau/Coburg, Germany (www.duesen-schlick.de). The residence time of the droplets, and the reaction temperatures within the process, can be determined on the basis of computer-aided rheological simulation calculations. By way of example, "Fluent", Version 6.3, from Fluent (Fluent Deutschland GmbH, Birkenweg 14a, 64295 Darmstadt) is commercial software which can simulate the furnace reactor and, after input of all of the ingoing process streams, inclusive of the measured droplet-size distribution, can use its underlying chemical model to calculate the residence times and the vaporization rates of the fuel droplets, and the reaction temperatures.

The fuel can be a liquid fuel or a fuel which is to some extent liquid and to some extent gaseous.

The feedstocks used for the carbon black can be introduced through nozzles by means of radial lances. The number of radial lances used can be from 2-32, preferably from 4-16, particularly preferably from 4-8.

The feedstock used for the carbon black can be a liquid or gaseous feedstock or a feedstock which is to some extent liquid and to some extent gaseous.

The liquid feedstock used for the carbon black can be atomized by pressure, by steam, by compressed air, or by the gaseous feedstock.

Liquid feedstocks that can be used for the carbon black are liquid aliphatic or aromatic, saturated or unsaturated hydrocarbons, or a mixture thereof, or coal-tar distillates, or residual oils produced during the catalytic cracking of petroleum fractions or during olefin production via cracking of naphtha, or of gas oil.

The gaseous feedstock used for the carbon black can be gaseous aliphatic, saturated or unsaturated hydrocarbons, a mixture thereof, or natural gas.

The "K factor" is often used as a variable to characterize the excess of air. The K factor is the ratio between the amount of air needed for stoichiometric combustion of the fuel and the actual amount of air introduced into the combustion process. A K factor of 1 therefore means stoichiometric combustion. If there is an excess of air, the K factor is smaller than 1. K factors that can be used here are from 0.2 to 0.9, as is the case with known carbon blacks. Preferred K factors used are from 0.6 to 0.8.

The process described is not restricted to any particular reactor geometry, but rather can be adapted to various reactor types and reactor sizes.

The atomizers for the feedstock for the carbon black can be either atomizers operating purely by using pressure (one-fluid atomizers) or else two-fluid atomizers with internal or external mixing, and the atomizing medium used can be the gaseous feedstock used for the carbon black.

Two-fluid atomizers can be used for atomizing liquid feedstock used for the carbon black. In the case of one-fluid atomizers, a change in throughput can also lead to a change in droplet size, but in the case of two-fluid atomizers the droplet size can be controlled substantially independently of throughput.

If the feedstock used for the carbon black simultaneously comprises oil and gaseous hydrocarbons, e.g. methane, the gaseous hydrocarbons can be injected separately from the oil by way of a dedicated set of gas lances into the stream of hot exhaust gas.

The carbon blacks of the invention can be used as reinforcing filler or other filler, UV stabilizer, conductive carbon black, or pigment. The carbon blacks of the invention can be used in rubber, plastic, printing inks, inkjet inks, other inks, toners, lacquers, paints, and in paper, and in bitumen, concrete, and other construction materials. The carbon blacks of the invention can be used as reducing agents for metallurgical purposes.

The carbon blacks of the invention can be used as reinforcing carbon black in rubber mixtures.

The invention further provides rubber mixtures characterized in that they comprise at least one rubber, preferably at least one diene rubber, particularly preferably at least natural rubber, and at least one carbon black of the invention.

The amounts that can be used of the carbon black of the invention are from 10 to 150 phr (parts per hundred rubber), preferably from 20 to 100 phr, particularly preferably from 30 to 90 phr, very particularly preferably from 30 to 80 phr, based on the amount of the rubber used.

The rubber mixture of the invention can be comprise silica, preferably precipitated silica. The rubber mixture of the invention can comprise organosilanes, such as bis(triethoxysilylpropyl)polysulfide or (mercaptoorganyl)-alkoxysilanes.

The rubber mixture of the invention can comprise rubber auxiliaries.

Materials suitable for production of the rubber mixtures of the invention are not only natural rubber but also synthetic rubbers. Preferred synthetic rubbers are described by way of example in W. Hofmann, Kautschuktechnologie [Rubber technology], Genter Verlag, Stuttgart 1980. They encompass inter alia polybutadiene (BR),
polyisoprene (IR),
styrene/butadiene copolymers, such as emulsion SBR (ESBR) or solution SBR (SSBR), preferably having styrene content of from 1 to 60% by weight, particularly preferably from 2 to 50% by weight, based on the entirety of the polymer,
chloroprene (CR),
isobutylene/isoprene copolymers (IIR),
butadiene/acrylonitrile copolymers, preferably having acrylonitrile content of from 5 to 60% by weight, preferably from 10 to 50% by weight, based on the entirety of the polymer (NBR),
partially or fully hydrogenated NBR rubber (HNBR),
ethylene/propylene/diene copolymers (EPDM)
ethylene/propylene copolymers (EPM) or
abovementioned rubbers additionally having functional groups, such as carboxy, silanol, or epoxy groups, examples being epoxidized NR, carboxy-functionalized NBR, or silanol- (—SiOH) or siloxy-functionalized (—Si—OR) SBR,
and also mixtures of these rubbers.

Production of truck-tire treads can in particular use natural rubber, or else a mixture thereof with diene rubbers.

Production of car-tire treads can in particular use SBR, or else a mixture thereof with other diene rubbers.

The rubber mixtures of the invention can comprise further rubber auxiliaries, such as reaction accelerators, antioxidants, heat stabilizers, light stabilizers, antiozonants, processing aids, plasticizers, tackifiers, blowing agents, dyes, pigments, waxes, extenders, organic acids, retarders, metal oxides, and also activators, such as diphenylguanidine, triethanolamine, polyethylene glycol, alkoxy-terminated polyethylene glycol, or hexanetriol, these being known in the rubber industry.

The amounts used of the rubber auxiliaries can be conventional, depending inter alia on the intended use. Examples of conventional amounts can be amounts of from 0.1 to 50 phr, based on rubber.

Crosslinking agents that can be used are sulfur, organic sulfur donors, or free radical generators. The rubber mixtures of the invention can moreover comprise vulcanization accelerators.

Examples of suitable vulcanization accelerators can be mercaptobenzthiazoles, sulfenamides, guanidines, thiurams, dithiocarbamates, thioureas and thiocarbonates.

The amounts that can be used of the vulcanization accelerators and crosslinking agents are from 0.1 to 10 phr, preferably from 0.1 to 5 phr, based on rubber.

The blending of the rubbers with the filler, and if appropriate with rubber auxiliaries, and if appropriate with the organosilanes, can be conducted in or on conventional mixing assemblies, such as rolls, internal mixers, and mixing extruders. Rubber mixtures of this type can usually be produced in an internal mixer, beginning with one or more successive thermomechanical mixing stages in which the following are incorporated: the rubbers, the carbon black of the invention, if appropriate the silica, and if appropriate the organosilanes, and the rubber auxiliaries, at from 100 to 170° C. The sequence of addition and the juncture of addition of the individual components can have a decisive effect here on the properties obtained from the mixture. The crosslinking chemicals can then usually be admixed with the resultant rubber mixture in an internal mixer or on a roll system at from 40 to 130° C., preferably from 50 to 120° C., the mixture then being processed to give what is known as the crude mixture for the process steps that follow, examples being shaping and vulcanization.

The vulcanization of the rubber mixtures of the invention can take place at temperatures of 80 to 200° C., preferably from 130 to 180° C., if appropriate under pressure of from 10 to 200 bar.

The rubber mixtures of the invention are suitable for production of moldings, e.g. for the production of pneumatic or other tires, tire treads, cable sheathing, hoses, drive belts, conveyor belts, roll coverings, shoe soles, sealing rings, profiles, and damping elements.

An advantage of the carbon black of the invention is good abrasion resistance together with good rolling resistance in rubber mixtures.

EXAMPLES

Example 1

Production of Carbon Black

A series of carbon blacks of the invention are produced in the carbon-black reactor shown in FIG. 1.

FIG. 1 shows a longitudinal section through the furnace reactor. The carbon-black reactor has a combustion chamber 5, in which the hot process gas for the pyrolysis of the carbon black oil is produced via combustion of fuel with introduction of an excess of atmospheric oxygen. The inventive carbon black is produced by using carbon black oil as fuel. The comparative carbon black is produced by using natural gas as fuel.

The combustion air is introduced by way of a plurality of apertures 2, distributed concentrically around the circular end wall of the combustion chamber. The fuel is introduced by way of the axial burner lance 1 into the combustion chamber. The burner lance can be displaced axially in order to optimize conduct of the process in the invention. The combustion chamber narrows conically in the direction of the narrowest section 6. The feedstock used for the carbon black is introduced through nozzles by way of radial lances 3 at or prior to the narrowest section. Once the narrowest section has been passed, the reaction-gas mixture expands into the reaction chamber 7.

A, B, and C indicate various positions for the injection of the carbon black oil into the hot process gas by means of the oil lances 3. At the head of the oil lances there are suitable spray nozzles. At each injection position there are at least four injectors distributed across the periphery of the reactor.

In the termination zone, water spray is introduced via the quench-water lance 4.

Combustion zone, reaction zone, and termination zone are characterized in FIG. 1 by the Roman numerals I to III. The exact axial dimensioning of these depends on the respective positioning of the burner lance, of the oil lances, and of the quench-water lance.

The dimensions of the reactor used can be found in the following list:

|  | I |
| --- | --- |
| Greatest diameter of combustion chamber: | 930 mm |
| Length of combustion chamber up to narrowest section: | 1660 mm |
| Length of conical part of combustion chamber: | 1300 mm |
| Diameter of narrowest section: | 114 mm |
| Length of narrowest section: | 80 mm |
| Diameter of reaction chamber: | 240 mm |
| Position of oil lances[1)] A | 40 mm |
| B | −215 mm |
| C | −500 mm |
| Maximum position of quench-water lance(s)[1)] | 8250 mm |

[1)]measured from the entry to the narrowest section
(+: after entry −: prior to entry)

To produce the carbon blacks of the invention, a carbon black oil having 92% by weight carbon content and 6% by weight hydrogen content is used as fuel and feedstock. To produce the comparative carbon black, natural gas is used as fuel and a carbon black oil having 92% by weight carbon content and 6% by weight hydrogen content is used as feedstock.

The reactor parameters for production of the carbon blacks of the invention are listed in Table 1. 5 different carbon blacks are produced (carbon blacks 1 to 4 of the invention and comparative carbon black 5). The production conditions differ in particular in relation to the amount of the feedstock injected at and, respectively, prior to the narrowest section.

The carbon blacks produced are subjected to the conventional wet pelletization process prior to characterization and incorporation into the rubber mixtures.

TABLE 1

| Reactor parameter | Unit | Inventive carbon black 1 | Inventive carbon black 2 | Inventive carbon black 3 | Inventive carbon black 4 | Comparative carbon black 5 |
|---|---|---|---|---|---|---|
| Combustion air | m³ (STP)/h | 2800 | 2800 | 2601 | 2803 | 3301 |
| Temperature of combustion air | °C. | 620 | 620 | 620 | 620 | 620 |
| Fuel (carbon black oil) | kg/h | 199 | 201 | 220 | 202 | 0 |
| Fuel (natural gas) | m³ (STP)/h | 0 | 0 | 0 | 0 | 238 |
| Atomizer air | m³ (STP)/h | 190 | 190 | 190 | 190 | 0 |
| Feedstock pos. A | kg/h | 600 | 610 | 454 | 455 | 0 |
| Feedstock pos. B | kg/h | 140 | 140 | 115 | 105 | 570 |
| Feedstock pos. C | kg/h | 0 | 0 | 0 | 0 | 0 |
| Carbon black oil temperature | °C. | 117 | 119 | 120 | 118 | 120 |
| Additive (K₂CO₃) | g/h | 7 | 36 | 18 | 65 | 239 |
| Quench position | mm | 1095 | 1960 | 1960 | 1095 | 1095 |
| Vaporized fuel 5 ms prior to first encounter with feedstock | % by wt. | 98 | 98 | 92 | 98 | 100 |
| Vaporized fuel on encounter with feedstock | % by wt. | 100 | 100 | 100 | 100 | 100 |

1) Measured from the start of the narrowest section

The proportion of vaporized fuel 5 ms prior to first encounter with the feedstock, and of vaporized fuel on encounter with the feedstock, are calculated using version 6.3 of the "Fluent" program, using a computer-aided rheological simulation calculation.

Table 2 lists the analytical data for the carbon blacks produced:

TABLE 2

| | | Analytical data | | | | | | | |
|---|---|---|---|---|---|---|---|---|---|
| | | Group 1 | | | Group 2 | | Group 3 | | Group 4 |
| | | Carbon black | | | | | | | |
| Analytical data | | Comparative carbon black 1 N 121 | Comparative carbon black 2 Ecorax 1720 | Inventive carbon black 1 | Comparative carbon black 3 N 220 | Inventive carbon black 2 | Comparative carbon black 4 N 134 | Inventive carbon black 3 | Comparative carbon black 5 | Inventive carbon black 4 |
| CTAB | m²/g | 119.1 | 117.1 | 120.9 | 110.0 | 111.6 | 129.3 | 134.5 | 146.7 | 152.4 |
| COAN | cm³/100 g | 111.9 | 109.6 | 118.5 | 102.5 | 102.1 | 101.8 | 112.7 | 109.3 | 100.8 |
| NSA | m²/g | 118.3 | 125.8 | 122.7 | 113.3 | 110.1 | 134.9 | 144.0 | 145.3 | 158.3 |
| Quartile ratio | | 1.60 | 2.01 | 1.91 | 1.49 | 1.98 | 1.55 | 1.95 | 1.59 | 2.19 |
| Tint strength | | 120.7 | 107.6 | 121.5 | 122.5 | 120.8 | 131.9 | 129.4 | 136.3 | 130.4 |
| FP index | | −8.47 | −7.49 | 5.06 | −18.93 | 3.90 | −7.69 | 8.52 | −3.61 | 1.79 |
| Fraction >150 nm | % | 1.1 | 14.7 | 8.1 | 0.4 | 9.9 | 1.3 | 5.7 | 0.1 | 5.6 |
| mode | nm | 73 | 68 | 58 | 74 | 57 | 64 | 54 | 60 | 43 |
| ΔD-50 | nm | 61 | 76 | 66 | 54 | 68 | 50 | 72 | 53 | 68 |
| ΔD-50/mode | | 0.84 | 1.12 | 1.14 | 0.73 | 1.19 | 0.78 | 1.33 | 0.88 | 1.58 |

Comparative carbon black 1 is Corax® N 121 from Evonik Degussa GmbH. Comparative carbon black 2 is Ecorax® 1720 from Evonik Degussa GmbH. Comparative carbon black 2 is produced by the process described in EP 0949303. Comparative carbon black 3 is Corax® N 220 from Evonik Degussa GmbH. Comparative carbon black 4 is Corax® N 134 from Evonik Degussa GmbH.

Example 2

Vulcanizate Tests in Natural Rubber

Table 3 below gives the formulation used for the natural rubber mixtures. The unit phr here means parts by weight, based on 100 parts of the crude rubber used.

The general method for the production of rubber mixtures and vulcanizates thereof is described in the following book: "Rubber Technology Handbook", W. Hofmann, Hanser Verlag 1994.

TABLE 3

|  | phr |
|---|---|
| Stage 1 | |
| SMR 10 ML4 = 60-70 | 100.0 |
| Carbon black | 52.0 |
| Stearic acid | 3.0 |
| ZnO | 3.0 |
| Vulkanox ® 4020 | 1.0 |
| Vulkanox ® HS | 1.0 |
| Protektor ® G3108 | 1.0 |
| Stage 2 | |
| Stage 1 batch | |
| Sulfur | 1.5 |
| Rhenogran ® TBBS-80 | 1.2 |

SMR10 natural rubber, ML4=from 60-70, is SMR10 which is masticated on a roll mill by the usual methods prior to the incorporation mixing process, with at least 24 hours, but at most 1 week, of intermediate storage at room temperature after the mastication process. The ML 1+4 (100° C.) value for this masticated SMR10 is in the range from 60 to 70. The ML 1+4 value is measured to DIN 53523/3.

Vulkanox® 4020 is the antioxidant 6PPD from LanXess AG.

Vulkanox® HS is the antioxidant TMQ from Lanxess AG.

Protektor® G3108 is an antiozonant wax from Paramelt B.V.

Rhenogran® TBBS-80 is a TBBS-type vulcanization accelerator from Rhein-Chemie GmbH, comprising 80% of active ingredient.

The rubber mixtures were produced in an internal mixer in accordance with the mixing specification in Table 4.

TABLE 4

| Stage 1 | |
|---|---|
| Settings | |
| Mixing assembly | Werner und Pfleiderer GK 1.5N |
| Rotation rate | 65 rpm |
| Ram pressure | 5.5 bar |
| Capacity | 1.6 l |
| Fill level | 0.70 |
| Chamber temperature | 70° C. |

TABLE 4-continued

| Mixing procedure | |
|---|---|
| 0 up to 1 min | Natural rubber |
| 1 up to 2 min | ½ carbon black |
| 2 up to 5 min | ½ carbon black, stearic acid, ZnO, Vulkanox, Protektor |
| 5 min | purge |
| 5 up to 6 min | mix and discharge |
| Batch temperature | 145-155° C. |
| Storage | 24 h at room temperature |
| Stage 2 | |
| Settings | |
| Mixing assembly | Werner und Pfleiderer GK 1.5N |
| Rotation rate | 40 rpm |
| Ram pressure | 5.5 bar |
| Capacity | 1.6 l |
| Fill level | 0.68 |
| Chamber temperature | 60° C. |
| Mixing procedure | |
| 0 up to 2 min | Stage 1 batch, sulfur, TBBS-80 |
| Batch temperature | 100-110° C. |
| 2 min | Discharge and form milled sheet on Troester WNU 1 laboratory roll mill (diameter 150 mm, length 350 mm, roll temperature 40/50° C., 17/21 rpm) Homogenize: Cut the material and fold it over 3 times toward the left and 3 times toward the right, and roll the material 3 times with wide roll gap (6 mm) and 3 times with narrow roll gap (3 mm), and then draw off milled sheet. |
| Batch temperature | <110° C. |

Table 5 collates the methods used for rubber testing.

TABLE 5

| Physical testing/conditions | Standard |
|---|---|
| Ring tensile test 1, 23° C. | DIN 53504, ISO 37 |
| Tensile strength (MPa) | |
| Modulus at 100% elongation (MPa) | |
| Modulus at 300% elongation (MPa) | |
| Elongation at break (%) | |
| Goodrich flexometer test, 0.175 inch displacement, 2 h, 23° C. | DIN 53533, ASTM D623 A |
| Needle temperature (° C.) | |
| Shore hardness, 23° C. | DIN 53505 |
| Shore A | |
| DIN abrasion, 10N, 23° C. | DIN 53 516 |
| Abrasion (mm * mm * mm) | |

Table 6 shows the results of vulcanizate testing. The vulcanization time for the mixtures is 17 minutes.

TABLE 6

| | Natural rubber mixture | | | | | | | | |
|---|---|---|---|---|---|---|---|---|---|
| | Group 1 | | | Group 2 | | Group 3 | | Group 4 | |
| | Mixture 1 | Mixture 2 | Mixture 3 | Mixture 4 | Mixture 5 | Mixture 6 | Mixture 7 | Mixture 8 | Mixture 9 |
| | Carbon black (52 phr) | | | | | | | | |
| | Comparative carbon black 1 | Comparative carbon black 2 | Inventive carbon black 1 | Comparative carbon black 3 | Inventive carbon black 2 | Comparative carbon black 4 | Inventive carbon black 3 | Comparative carbon black 5 | Inventive carbon black 4 |
| Vulcanizate data | | | | | | | | | |
| Vulcanization time  min | 17 | 17 | 17 | 17 | 17 | 17 | 17 | 17 | 17 |

TABLE 6-continued

Natural rubber mixture

| | | Group 1 | | | Group 2 | | Group 3 | | Group 4 | |
|---|---|---|---|---|---|---|---|---|---|---|
| | | Mixture 1 | Mixture 2 | Mixture 3 | Mixture 4 | Mixture 5 | Mixture 6 | Mixture 7 | Mixture 8 | Mixture 9 |
| | | | | | Carbon black (52 phr) | | | | | |
| | | Comparative carbon black 1 | Comparative carbon black 2 | Inventive carbon black 1 | Comparative carbon black 3 | Inventive carbon black 2 | Comparative carbon black 4 | Inventive carbon black 3 | Comparative carbon black 5 | Inventive carbon black 4 |
| Tensile strain properties | | | | | | | | | | |
| Tensile strength | MPa | 23.6 | 21.8 | 21.6 | 23.8 | 23.6 | 25.6 | 24.0 | 25.7 | 24.7 |
| 100% modulus | MPa | 2.7 | 2.4 | 2.8 | 2.3 | 2.4 | 2.3 | 2.4 | 2.6 | 2.4 |
| 300% modulus | MPa | 15.0 | 13.6 | 15.5 | 12.3 | 13.6 | 12.9 | 13.2 | 14.0 | 12.6 |
| Elongation at break | % | 440 | 430 | 390 | 490 | 460 | 510 | 480 | 480 | 490 |
| Shore hardness | Shore A | 69 | 66 | 69 | 67 | 66 | 67 | 68 | 70 | 68 |
| DIN abrasion | mm$^3$ | 80 | 87 | 79 | 102 | 99 | 96 | 93 | 97 | 96 |
| Abrasion-resistance index | | 100 | 92 | 101 | 100 | 103 | 100 | 103 | 100 | 101 |
| Viscoelastic properties Goodrich flexometer | | | | | | | | | | |
| needle temperature | ° C. | 106 | 92 | 93 | 104 | 86 | 105 | 100 | 117 | 99 |
| Rolling-resistance index | | 100 | 115 | 114 | 100 | 121 | 100 | 105 | 100 | 118 |

The higher the DIN abrasion (mm$^3$) value, the poorer the abrasion resistance of the rubber mixture. The abrasion-resistance index is therefore calculated for each carbon black within the respective carbon black group, as follows:

Abrasion-resistance index=(DIN abrasion of reference carbon black within the group/DIN abrasion)*100.

The reference carbon black within group 1 is comparative carbon black 1, the reference carbon black within group 2 is comparative carbon black 3, the reference carbon black within group 3 is comparative carbon black 4 and the reference carbon black within group 4 is comparative carbon black 5.

An abrasion-resistance index >100 therefore indicates improved abrasion resistance, and values <100 indicate impaired abrasion resistance, relative to the respective reference carbon black within the group.

The higher the needle temperature (° C.) value, the higher the level of heat generation and therefore the higher the hysteresis on dynamic stress within the rubber mixture, the expected rolling resistance therefore being poorer. The rolling-resistance index is therefore calculated as follows for each carbon black within the respective carbon black group:

Rolling-resistance index=(needle temperature of reference carbon black within the group/needle temperature)*100.

A rolling-resistance index >100 therefore indicates improved, i.e. reduced, rolling resistance, and values <100 indicate impaired rolling resistance, relative to the respective reference carbon black within the group.

The results in Table 6 show that each of the carbon blacks of the invention, with FP index >0, has a better balance of abrasion resistance and rolling resistance than the comparative carbon blacks with FP index <0, in the context of a balanced general vulcanizate property profile.

Example 3

Vulcanizate Testing in ESBR

Table 7 below gives the formulation used for the ESBR mixtures.

TABLE 7

| | phr |
|---|---|
| Stage 1 | |
| Krynol ® ESBR 1712 | 137.5 |
| Carbon black | 80.0 |
| Stearic acid | 2.0 |
| ZnO | 3.0 |
| Vulkanox ® 4020 | 1.5 |
| Protektor ® G3108 | 1.0 |
| Stage 2 | |
| Stage 1 batch | |
| Stage 3 | |
| Stage 2 batch | |
| Sulfur | 1.75 |
| Vulkacit ® CZ/EG-C | 1.50 |
| Perkazit TBZTD-PDR-D | 0.20 |

Krynol® 1712 ESBR is an ESBR from Lanxess AG, extended with 37.5 phr of oil.

Vulcanization accelerator Vulkacit® CZ/EG-C is CBS from Lanxess AG. Vulcanization accelerator Perkacit TBZTD-PDR-D is TBZTD from Flexsys N.V.

The rubber mixtures are produced in an internal mixer in accordance with the mixing specification in Table 8.

TABLE 8

| Stage 1 | |
|---|---|
| Settings | |
| Mixing assembly | Werner und Pfleiderer GK 1.5N |
| Rotation rate | 60 rpm |
| Ram pressure | 5.5 bar |
| Capacity | 1.6 l |
| Fill level | 0.70 |
| Chamber temperature | 60° C. |

TABLE 8-continued

Mixing procedure

| | |
|---|---|
| 0 up to 1 min | rubber |
| 1 up to 3 min | ½ carbon black |
| 3 up to 4 min | ½ carbon black, Vulkanox, Protektor, ZnO, stearic acid |
| 4 min | purge |
| 4 up to 5 min | mix and discharge |
| Batch temperature | 145-155° C. |
| Storage | 24 h at room temperature |

Stage 2

Settings

| | |
|---|---|
| Mixing assembly | Werner und Pfleiderer GK 1.5N |
| Rotation rate | 70 rpm |
| Ram pressure | 5.5 bar |
| Capacity | 1.6 l |
| Fill level | 0.68 |
| Chamber temperature | 80° C. |

Mixing procedure

| | |
|---|---|
| 0 up to 2 min | Stage 1 batch |
| 2 up to 5 min | Maintain 150° C. batch temperature by varying rotation rate |
| 5 min | Discharge |
| Batch temperature | 145-155° C. |
| Storage | 24 h at room temperature |

Stage 3

Settings

| | |
|---|---|
| Mixing assembly | Werner and Pfleiderer GK 1.5N |
| Rotation rate | 30 rpm |
| Ram pressure | 5.5 bar |
| Capacity | 1.6 l |
| Fill level | 0.66 |
| Chamber temperature | 40° C. |

Mixing procedure

| | |
|---|---|
| 0 up to 2 min | Stage 2 batch, Vulkacit, Perkazit, sulfur |
| Batch temperature | <110° C. |
| 2 min | Discharge and form milled sheet on Troester WNU 1 laboratory roll mill (diameter 150 mm, length 350 mm, roll temperature 40/50° C., 17/21 rpm) Homogenize: Cut the material and fold it over 3 times toward the left and 3 times toward the right, and 10 times with wide roll gap (6 mm), and then draw off milled sheet. |
| Batch temperature | <110° C. |

Table 9 shows the results of vulcanizate testing. The vulcanization time for the mixtures is 13 minutes.

TABLE 9

| | | ESBR Mixture | | | | |
|---|---|---|---|---|---|---|
| | | Group 5 | | | Group 6 | |
| | | Mixture 10 | Mixture 11 | Mixture 12 | Mixture 13 | Mixture 14 |
| | | Carbon black (80 phr) | | | | |
| | | Comparative carbon black 1 | Comparative carbon black 2 | Inventive carbon black 1 | Comparative carbon black 3 | Inventive carbon black 2 |
| Vulcanizate data | | | | | | |
| Vulcanization time | min | 13 | 13 | 13 | 13 | 13 |
| Tensile strain properties | Ring | | | | | |
| Tensile strength | MPa | 18.8 | 19.6 | 19.8 | 16.9 | 18.0 |
| 100% modulus | MPa | 2.3 | 2.0 | 2.1 | 1.8 | 2.0 |
| 300% modulus | MPa | 12.3 | 11.6 | 11.7 | 9.6 | 10.8 |
| Elongation at break | % | 410 | 450 | 440 | 450 | 440 |
| Shore hardness | Shore A | 70 | 66 | 69 | 67 | 67 |
| DIN abrasion | mm³ | 68 | 70 | 66 | 74 | 75 |
| Abrasion-resistance index | | 100 | 97 | 103 | 100 | 99 |
| Viskoelastic properties | | | | | | |
| Goodrich flexometer | | | | | | |
| needle temperature | ° C. | 148 | 127 | 127 | 142 | 124 |
| Rolling-resistance index | | 100 | 117 | 117 | 100 | 115 |

| | | ESBR Mixture | | | |
|---|---|---|---|---|---|
| | | Group 7 | | Group 8 | |
| | | Mixture 15 | Mixture 16 | Mixture 17 | Mixture 18 |
| | | Carbon black (80 phr) | | | |
| | | Comparative carbon black 4 | Inventive carbon black 3 | Comparative carbon black 5 | Inventive carbon black 4 |
| Vulcanizate data | | | | | |
| Vulcanization time | min | 13 | 13 | 13 | 13 |

TABLE 9-continued

| Tensile strain properties | Ring | | | | |
|---|---|---|---|---|---|
| Tensile strength | MPa | 17.9 | 19.4 | 18.5 | 20.5 |
| 100% modulus | MPa | 1.9 | 2.0 | 2.1 | 1.8 |
| 300% modulus | MPa | 10.0 | 10.3 | 10.4 | 9.0 |
| Elongation at break | % | 440 | 480 | 450 | 520 |
| Shore hardness | Shore A | 68 | 69 | 72 | 68 |
| DIN abrasion | mm³ | 81 | 77 | 104 | 101 |
| Abrasion-resistance index | | 100 | 105 | 100 | 103 |
| Viskoelastic properties Goodrich flexometer | | | | | |
| needle temperature | ° C. | 143 | 143 | 161 | 138 |
| Rolling-resistance index | | 100 | 100 | 100 | 117 |

The reference carbon black within group 5 is comparative carbon black 1, the reference carbon black within group 6 is comparative carbon black 3, the reference carbon black within group 7 is comparative carbon black 4 and the reference carbon black within group 8 is comparative carbon black 5.

The results in Table 9 show that each of the carbon blacks of the invention, with FP index >0, has a better balance of abrasion resistance and rolling resistance than the comparative carbon blacks with FP index <0, in the context of a balanced general vulcanizate property profile.

What is claimed is:

1. A carbon black, characterized in that the CTAB surface area is from 100 to 160 m²/g, the quartile ratio is greater than 1.60, and the FP index is >0.

2. The carbon black as claimed in claim 1, characterized in that the FP index is >0.5.

3. The carbon black as claimed in claim 1, characterized in that the fraction of the particles >150 nm in the aggregate-size distribution is smaller than 20% by weight.

4. A process for producing the carbon black as claimed in claim 1 in a furnace-black reactor which comprises, along the reactor axis, a combustion zone, a reaction zone, and a termination zone, via production of a stream of hot exhaust gas in the combustion zone via combustion of a fuel in an oxygen-containing gas and passage of the exhaust gas from the combustion zone via the reaction zone into the termination zone, mixing to incorporate a feedstock used for the carbon black into the hot exhaust gas in the reaction zone, and termination of carbon black formation in the termination zone via introduction of water spray, wherein from 60 to 90% by weight of the feedstock used for the carbon black is introduced through nozzles arranged as a plurality of radial lances within the first third of the reaction, zone, and the remaining amount of the feedstock used for the carbon black is introduced through nozzles arranged as a plurality of radial lances upstream at at least one further point into the reactor, and the fuel is conducted in such a way that on first encounter with the feedstock used for the carbon black from 90 to 100% by weight of the fuel has vaporized, and 5 ins prior to encountering the feedstock used for the carbon black from 80 to 99% by weight of the fuel has vaporized.

5. A method of preparing a composition, comprising introducing the carbon black of claim 1 in a composition as a reinforcing filler, a filler, a UV stabilizer, a conductive carbon black, or a pigment.

6. A method preparing a rubber mixture, comprising introducing the carbon black of claim 1 as a reinforcing filler in a rubber mixture.

7. A rubber mixture, characterized in that it comprises at least one rubber and at least one carbon black as claimed in claim 1.

8. The rubber mixture as claimed in claim 7, characterized in that the rubber is a diene rubber.

9. The rubber mixture as claimed in claim 8, characterized in that the diene rubber is a natural rubber.

10. A carbon black, characterized in that
the ΔD-50/mode ratio is greater than or equal to 1.1,
the CTAB surface area is from 100 to 160 m²/g,
the quartile ratio is greater than 1.60, and
the FP index is >0.

11. The carbon black as claimed in claim 10, characterized in that the ΔD-50/mode ratio is less than or equal to 1.14.

12. The carbon black as claimed in claim 10, characterized in that the ΔD-50/mode ratio is less than or equal to 1.19.

13. The carbon black as claimed in claim 10, characterized in that the ΔD-50/mode ratio is less than or equal to 1.33.

14. The carbon black as claimed in claim 10, characterized in that the ΔD-50/mode ratio is less than or equal to 1.58.

15. A process for producing carbon black in a furnace-black reactor which comprises, along the reactor axis, a combustion zone, a reaction zone, and a termination zone, via production of a stream of hot exhaust gas in the combustion zone via combustion of a fuel in an oxygen-containing gas and passage of the exhaust gas from the combustion zone via the reaction zone into the termination zone, mixing to incorporate a feedstock used for the carbon black into the hot exhaust gas in the reaction zone, and termination of carbon-black formation in the termination zone via introduction of water spray, wherein from 60 to 90% by weight of the feedstock used for the carbon black is introduced through nozzles arranged as a plurality of radial lances within the first third of the reaction zone, and the remaining amount of the feedstock used for the carbon black is introduced through nozzles arranged as a plurality of radial lances upstream at at least one further point into the reactor, and the fuel is conducted in such a way that on first encounter with the feedstock used for the carbon black from 90 to 100% by weight of the fuel has vaporized, and 5 ms prior to encountering the feedstock used for the carbon black from 80 to 99% by weight of the fuel has vaporized.

* * * * *

UNITED STATES PATENT AND TRADEMARK OFFICE
CERTIFICATE OF CORRECTION

PATENT NO. : 8,735,488 B2  
APPLICATION NO. : 12/680453  
DATED : May 27, 2014  
INVENTOR(S) : Pelster et al.

Page 1 of 1

It is certified that error appears in the above-identified patent and that said Letters Patent is hereby corrected as shown below:

In the Claims

In claim 4, (column 17, line 52), delete the "," between the terms "reaction" and "zone".

In claim 4, (column 17, line 58), replace the language "5 ins" with the language --5 ms--.

Signed and Sealed this
Nineteenth Day of May, 2015

Michelle K. Lee
*Director of the United States Patent and Trademark Office*